Dec. 4, 1962    H. W. PARKER    3,066,372
SECURING MEANS FOR MONOFILAMENT LINES AND THE LIKE
Filed Oct. 21, 1960
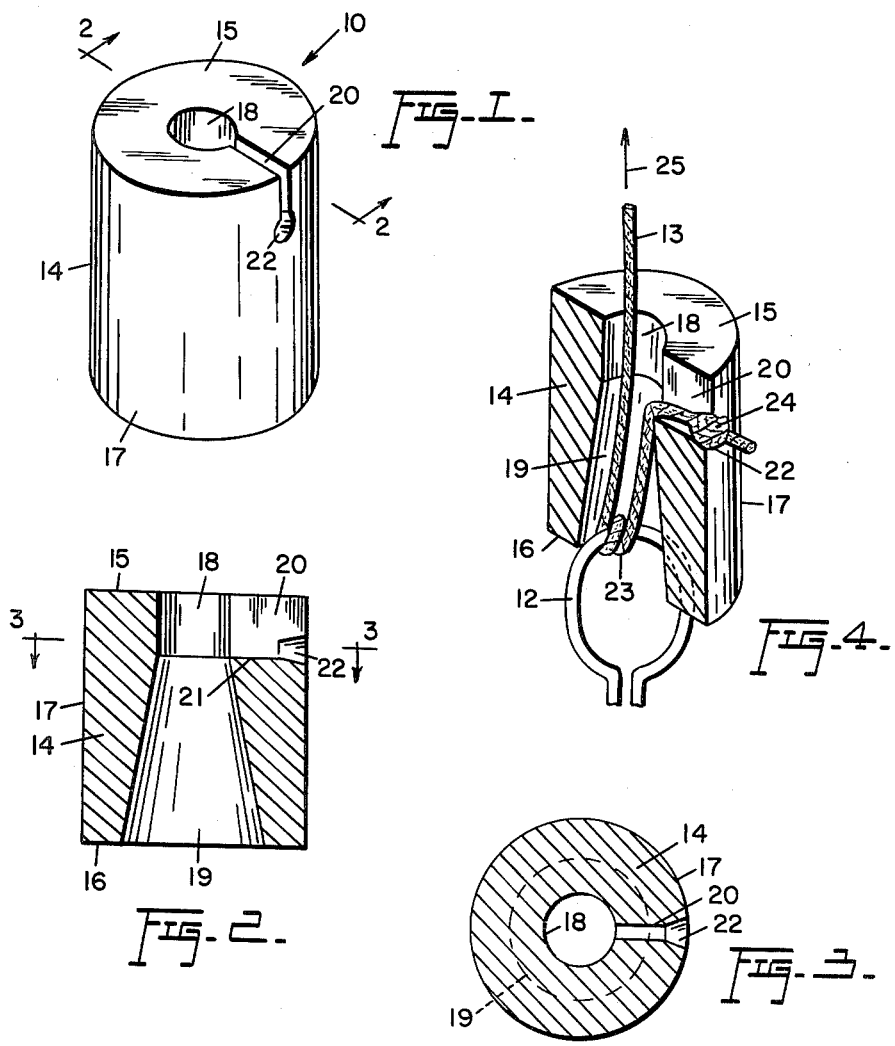
INVENTOR
HEADLY W. PARKER
BY *Featherstonhaugh & Kent*
ATTORNEYS

United States Patent Office 3,066,372
Patented Dec. 4, 1962

3,066,372
SECURING MEANS FOR MONOFILAMENT LINES
AND THE LIKE
Headly W. Parker, 698 Lorrette Ave.,
Winnipeg, Manitoba, Canada
Filed Oct. 21, 1960, Ser. No. 64,130
1 Claim. (Cl. 24—128)

My invention relates to new and useful improvements in securing means for monofilament fishing lines.

It is well known that monofilament line is difficult to tie around a swivel ring or the like due to the extreme slipperiness of the line.

Such knots often pull loose under the strain and furthermore the very act of knotting weakens the monofilament line, a condition extremely important when dealing with relatively light low poundage line.

I have overcome these disadvantages by providing a ferrule which is adapted to receive the line and secure same to a swivel ring or the like, means being provided to anchor the free end of the line within the ferrule thus forming a secure attaching means without weakening the line unduly.

The principal object and essence of my invention is therefore to provide a device of the character herewithin described which enables a fisherman rapidly and easily to attach the end of a monofilament line to a swivel ring or the like.

Another object of my invention is to provide a device of the character herewithin described which permits such attachment to be made without the formation of intricate knots, the tying of which can be extremely difficult under adverse weather conditions.

Yet another object of my invention is to provide a device of the character herewithin described which is readily adaptable for use with different thicknesses of monofilament line within limits.

A still further object of my invention is to provide a device of the character herewithin described which, if manufactured from lead, adds a controlled weight to the end of the line or, alternatively, if manufactured from plastic, adds negligible weight to the end of the line.

A further object of my invention is to provide a device of the character herewithin described which is extremely simple in use, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of the invention;

FIGURE 2 is a longitudinal sectional view, taken substantially in the plane of the line 2—2 in FIGURE 1;

FIGURE 3 is a cross-sectional view, taken substantially in the plane of the line 3—3 in FIGURE 2;

FIGURE 4 is a perspective view showing the device longitudinally sectioned, with the line and eye member applied thereto.

In the drawings like characters of reference indicate corresponding parts in the different figures.

Before proceeding with the description of my invention, it should be pointed out that the drawings are shown in an enlarged form and that the fishing line illustrated is shown with a weave for clarity. However, it will be appreciated that although this device is designed primarily for use with monofilament line, it can be used with conventional relatively thin woven fishing line.

Referring now to the drawings in detail, the invention comprises a ferrule which is designated generally by the numeral 10 and which may be employed for securing a suitable eye member 12 to a flexible line 13.

The ferrule 10 consists of a substantially cylindrical body 14 having a pair of ends 15, 16 and a lateral surface 17. The body 14 is provided with an axial line receiving passage which includes a relatively restricted cylindrical passage portion 18 open at the body end 15, and a relatively unrestricted, frusto-conical passage portion 19 which has its major end open at the body end 16, while its minor end communicates with the passage portion 18.

The portion of the body 14 adjacent the end 15 is provided with a radially extending slot 20, having a closed bottom 21 and being open at the body end 15 as well as at the lateral surface 17 of the body, as shown. The side walls of the slot 20 form a relatively narrow opening in communication with the passage portion 18, but the bottom portion of the slot at the lateral surface 17 is provided with an enlargement 22, as illustrated.

When the device is placed in use, the line 13 is passed through the passage portions 18, 19 and is wrapped around the eye member 12 as indicated at 23. A knot 24 is tied at the end of the line, and the end portion of the line is passed upwardly through the passage portions 19, 18 so that the end portion of the line adjacent the knot may be inserted into the slot 20, with the knot 24 being received in the slot enlargement 22. Then, by pulling the line 13 in the direction of the arrow 25, the eye member 12 is drawn into the passage portion 19 while the line is tightened with the knot seated in the slot enlargement, so that the eye member is firmly secured to the line by the ferrule. It will be noted that the intromission of the eye member 12 in the passage portion 19 effectively shields the portion 23 of the line against abrasion.

If it is desired to add a controlled amount of weight to the end of the line, then the ferrule can be manufactured from lead under which circumstances it should be appreciated that all edges and corners engaged by the line should be rounded slightly.

Alternatively, if it is not desired to add weight to the end of the line, then the ferrule can be manufactured of a relatively soft plastic which will not damage the line where it passes therethrough.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

For use with an eye member and a flexible line having a knot at one end thereof, a ferrule for securing said eye member to said line, said ferrule comprising a substantially cylindrical body having a lateral surface and first and second ends, said body being provided with an axial line receiving passage including a relatively constricted cylindrical passage portion open at the first end of the body and a relatively unrestricted frusto-conical passage portion having its major diameter open at the second end of the body and adapted to receive the stated eye member therein with the stated line looped through the eye member, the first end portion of said body being provided with a radially extending line receiving slot having a closed bottom and an open top at said first end of the body, said slot also having side walls forming a relatively narrow opening in communication with said cylindrical passage portion and a relatively wider line knot receiving opening at said closed bottom.

(References on following page)

References Cited in the file of this patent

UNITED STATES PATENTS

| | | |
|---|---|---|
| 171,890 | Wagner | Jan. 4, 1876 |
| 173,688 | Taylor | Feb. 15, 1876 |
| 1,460,333 | Aime | June 26, 1923 |
| 2,151,609 | Menderman | Mar. 21, 1939 |
| 2,316,950 | Goeller | Apr. 20, 1943 |
| 2,592,696 | Hoody | Apr. 15, 1952 |
| 2,784,519 | Ralston et al. | Mar. 12, 1957 |

FOREIGN PATENTS

| | | |
|---|---|---|
| 703,270 | France | Feb. 3, 1931 |
| 1,013,931 | Germany | Aug. 14, 1957 |